Figure 1:
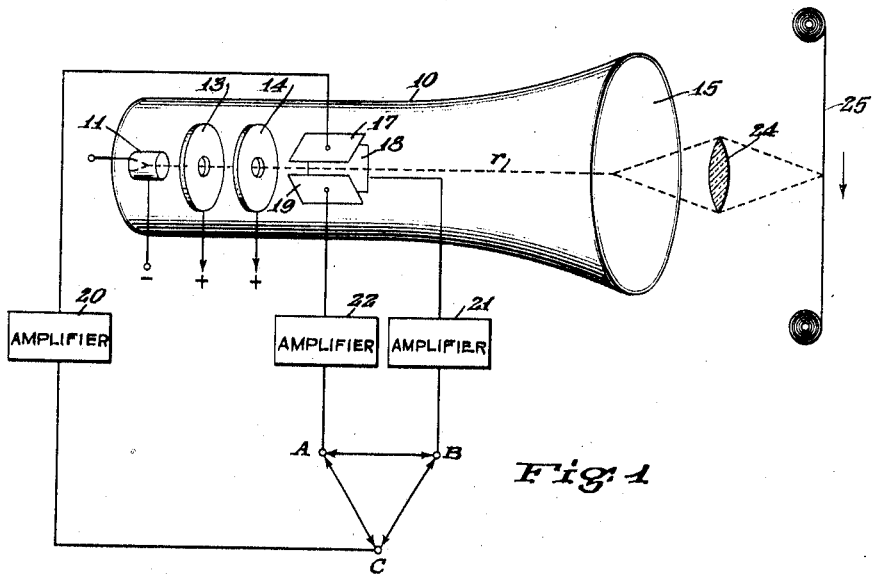

Dec. 31, 1940. H. E. HOLLMANN 2,227,135
ELECTRO-CARDIOGRAPH
Filed April 14, 1938

INVENTOR.
Hans Erich Hollmann
BY
ATTORNEY.

Patented Dec. 31, 1940

2,227,135

UNITED STATES PATENT OFFICE 2,227,135

ELECTROCARDIOGRAPH

Hans Erich Hollmann, Berlin-Lichterfelde, Germany, assignor to Radio Patents Corporation, New York, N. Y., a corporation of New York Application April 14, 1938, Serial No. 201,896
In Germany May 13, 1937

5 Claims. (Cl. 128—2.06)

The present invention relates to means for and a method of oscillographically recording variable phenomena, more particularly to the recording of the bio-electrical potentials generated by the rhythmic contractions of the heart in the human and animal organism known as electrocardiography, although not limited thereto.

In modern electrocardiography it has become no longer sufficient to record the temporal variations of the biological or action potentials in the form of the known electrocardiograms, and endeavors have been made to directly record several potentials tapped from different points on the surface of the body both with regard to amplitude and phase by vectorial combination of these potentials. In this manner polar curves are obtained according to the known two-phase or Lissajou method or on the basis of a three-phase recording method as described in my copending patent application, Serial No. 148,326 filed June 15, 1937. Such polar curves present an extremely clear picture of the function of the cardiac muscle structure and may serve for diagnosing purposes in a more simple and reliable manner and for determining additional data about the condition and function of the heart compared with the conventional electrocardiographic methods.

From the standpoint of the diagnostician, it is desirable not only to know the geometrical shape of a polar diagram of this type, but in addition to determine the sense of rotation in which the diagram is described by the recording beam of the oscillograph. When using photographic recording upon a stationary photographic plate, film, or the like, the sense of rotation is completely lost since the image obtained is a stationary image. On the other hand, the sense of rotation may be ascertained visually only by the trained eye and this only with difficulty and without reliability due to the fact that the initial portions of the diagram which are of particular importance and interest in the evaluation or diagnosing process are passed so rapidly that the entire diagram appears to the eye as a closed continuous curve, making it impossible to discern the sense of rotation of the recording spot or point.

A possible solution of the above problem would consist in decreasing the apparent speed of rotation of the recording beam which may be a light beam or an electron ray in the case of a cathode ray oscillograph by stroboscopic means such as by interrupting or chopping the recording light or electron beam in accordance with a chopping frequency in such a manner that the individual recording spots travel slowly in the direction of rotation. This method however presents great difficulties in practice due to the additional apparatus required and furthermore due to difficulties in adjusting and balancing the chopping frequency as well as to the irregularity of the heart beats. Moreover, a photographic recording of the sense of rotation by this method is not possible. A further possible solution consists in the employment of a recording beam interrupted according to an arbitrary frequency, whereby the chopping impulses are of special shape such as with steep initial peaks followed by slowly decreasing portions in such a manner that the sense of rotation or recording of the diagram can be ascertained by the shape of the individual recording spots. This method, however, has the disadvantage that details of the diagram are lost due to its dissolution or subdivision into a more or less greater number of individual points.

Accordingly, an object of the present invention is the provision of an improved system and a method for indicating the sense of rotation of a polar diagram recorded oscillographically such as of a vectorial electrocardiogram of the type mentioned herein above.

According to the invention, the polar diagram is recorded upon a moving recording member or strip, thereby introducing a time axis or translatory movement of the recording spot in addition to the deflections in at least two different directions. In this manner the shape of the diagram is slightly distorted due to the superimposition of the rotary and translatory movements or deflections of the recording spot. However, it is possible from a thus obtained diagram to ascertain most easily and with absolute reliability whether the rotation of the recording beam is in a clockwise or anti-clockwise direction, i. e. whether the electric field in the heart rotation in the one or the other direction during a cardiac or heart beat cycle.

Figures 2, 3:
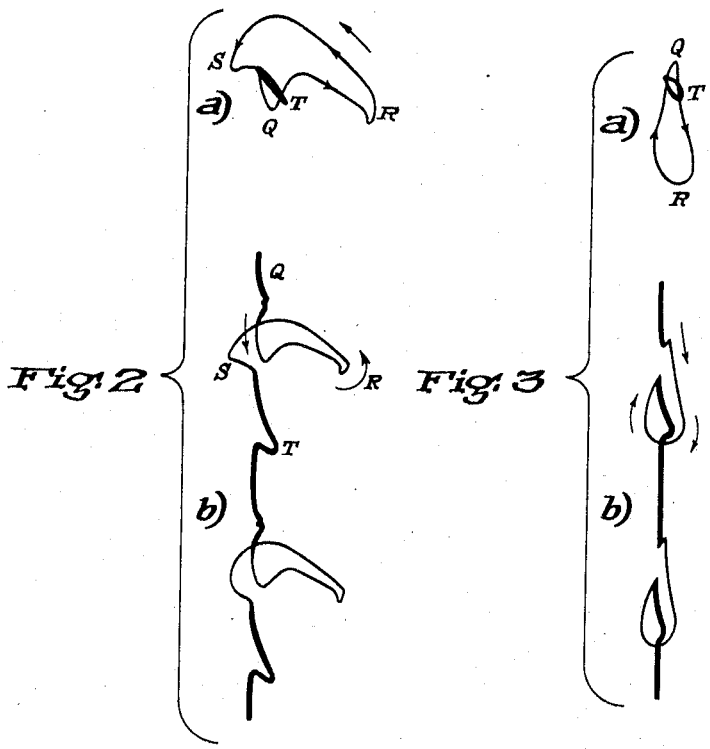

The invention will be further understood by the accompanying drawing wherein:

Figure 1 shows a simple recording system for producing a vectorial electrocardiogram from three heart potentials embodying the improvements according to the invention, and Figures 2 and 3 show, by way of example, curves obtained by a system and method according to Figure 1.

Referring to Figure 1, there is shown a simplified recording system of the type described in the above mentioned copending application. Item 10 represents a cathode ray tube comprising a ray generating system in the form of a cathode or source of electrons surrounded by a negatively biased pre-concentration cylinder 11 and an electronic lens or focussing arrangement consisting in the example shown of a pair of positively biased perforated diaphragmatic electrodes 13 and 14. By this or any other known means a concentrated electron ray is produced as indicated at $r$ and impinged upon a fluorescent screen 15 disposed at the opposite end of the tube in accordance with well known construction. The electron ray is deflected by a composite deflecting system comprising three deflecting plates 17, 18 and 19 arranged at angles of 60° to each other or to form an equi-lateral triangle and connected through amplifiers 20, 21 and 22, respectively, to three potential tapping points A, B and C on the surface of a human body such as to the right and left arms and to one of the legs in accordance with conventional practice. In this manner a vector diagram is described by the electron ray upon the fluorescent screen 15 such as shown in Figures 2a and 3b from the shape and position of which valuable conclusions and data may be derived regarding the condition and function of the heart of a patient.

According to the present invention, the polar diagram described upon the fluorescent screen 15 is recorded upon a moving photographic strip such as a film or the like shown at 25 by means of an optical lens system diagrammatically indicated at 24. In this manner the successive closed polar curves shown in 2a and 2b are expanded into a continuous curve, in the example illustrated where the strip 25 moves in the direction of the arrow in a downward direction as shown in Figs. 2b and 3b, respectively. By following the expanded curves in the direction of movement of the recording strip 25, it is seen that the diagram according to Figure 2b is described in a counter-clockwise direction while the diagram according to Figure 3b is described in clockwise direction. The case according to Figure 2b corresponds to a pronounced left-sided type and the case according to Figure 3b to a typical right-sided type as follows also from the initial horizontal and vertical position of the diagrams. It is further possible to ascertain from the sense of rotation the temporal sequence of the individual peaks of the diagram as is recognized clearly from the individual portions known as Q, R, S and T peaks in accordance with conventional practice, which would not be possible without a knowledge of the sense of rotation. The inventive method has special advantages in cases which deviate substantially from the examples illustrated such as in the case of a left-sided diagram described in a clockwise direction and a right-sided diagram described in a counter-clockwise fashion.

If the arrangment is such that in addition to the vectorial recording there is provided a means for recording the conventional electrocardiograms, i. e. a temporal representation of a single potential such as disclosed and shown in my above-mentioned copending application, the invention may be practised without requiring any additional apparatus by employing the mechanism for the moving recording strip or other means to introduce a time axis or translatory movement provided for the recording of the ordinary electrocardiograms. It is furthermore possible to impart the constant translatory movement to the electron beam by an additional deflecting system as is customary in oscillographic recording in which case the recording film or plate may be stationary.

It is understood from the above that the invention is not limited to the recording of electrocardiograms of the specific type shown and described for illustration but has equal advantages and application in the recording of diagrams for different purposes in accordance with the broad scope and spirit of the invention. The specification and drawing are therefore to be regarded in an illustrative rather than in a limited sense.

I claim:

1. In electrocardiographic apparatus, means for drawing a plurality of action potentials from a plurality of pairs of tapping points upon a human or animal organism located other than along a straight line, means for producing a radiant energy recording beam, a plurality of deflecting devices each arranged to be controlled by one of the action potentials drawn and oriented relative to each other to deflect said beam simultaneously in different directions angularly related like the connecting lines of the tapping points from which the respective potentials are drawn, a record carrier arranged to produce a record of the polar curve traced by said beam, and means to impart a translatory movement to the recording spot upon said record carrier to expand the polar traces corresponding to successive heart beat cycles into a continuous curve upon said record carrier to indicate the direction of rotation of the heart electric field during individual heart beat cycles.

2. In electrocardiographic apparatus, means for drawing a plurality of action potentials from a plurality of tapping points on a human or animal organism forming the corners of a polygon surrounding the heart, means for producing a radiant energy recording beam, a plurality of deflecting devices arranged to be controlled by potential drawn from each two adjacent tapping points and oriented relative to each other to deflect said beam simultaneously in different directions related like the connecting lines between the respective tapping points, a record carrier arranged to produce a record of the polar curve traced by said beam, and means to impart a translatory movement to the recording spot upon said record carrier to expand the polar traces corresponding to successive heart beat cycles into a continuous curve upon said record carrier to indicate the sense of rotation of the heart electric field during individual heart beat cycles.

3. In electrocardiographic apparatus, means for drawing a plurality of action potentials from three tapping points on a human or animal organism forming a triangle with the heart being substantially in the center thereof, a cathode ray oscillograph comprising means for generating a concentrated electron beam, a luminescent screen impinged by said beam, and a plurality of deflecting devices with circuit connections therefrom to said tapping points so as to be controlled each by one of the action potentials between adjacent tapping points, said deflecting devices being oriented relative to each other to simultaneously deflect said beam in different directions related like the connecting lines of the tapping points from which the respective potentials are drawn, a photographic record carrier, means for projecting upon said record carrier an image of the polar trace recorded upon said screen by said electron beam, and further means to impart a translatory movement to said record carrier to expand the individual polar traces corresponding to successive heart beats into a continuous record curve.

4. In the art of electrocardiography, the steps of drawing a plurality of action voltages from a plurality of pairs of tapping points forming the corners of a polygon with the heart being substantially in the center thereof, simultaneously deflecting a radiant energy recording beam in accordance with the varying magnitudes of said action voltages and in directions related as the lines connecting the tapping points from which the respective voltages are drawn, thereby to normally produce a succession of closed superimposed record traces during successive cardiac cycles, and imparting a translatory movement to the record produced to expand the closed record trace into a continuous curve of the record traces for successive cardiac cycles.

5. In the art of electrocardiography, the steps of drawing three action voltages from each two of three tapping points located on both arms and one leg of a patient, simultaneously deflecting a radiant energy recording beam in accordance with the varying magnitudes of said action voltages and in directions forming angles of 60° with each other, thereby to normally produce a succession of closed superimposed record traces during successive cardiac action cycles, and imparting a translatory movement to the record produced to expand the closed record trace into a continuous curve of record traces for successive cardiac cycles.

HANS ERICH HOLLMANN.